United States Patent
Frid

(10) Patent No.: US 9,078,086 B2
(45) Date of Patent: Jul. 7, 2015

(54) M2M RESOURCE PRESERVATION IN MOBILE NETWORKS

(75) Inventor: Lars Frid, Danderyd (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 191 days.

(21) Appl. No.: 13/504,168

(22) PCT Filed: Oct. 22, 2010

(86) PCT No.: PCT/EP2010/065960
§ 371 (c)(1),
(2), (4) Date: Apr. 26, 2012

(87) PCT Pub. No.: WO2011/051182
PCT Pub. Date: May 5, 2011

(65) Prior Publication Data
US 2012/0213185 A1 Aug. 23, 2012

Related U.S. Application Data

(60) Provisional application No. 61/256,056, filed on Oct. 29, 2009.

(51) Int. Cl.
H04W 4/00 (2009.01)
H04L 29/08 (2006.01)
H04L 29/06 (2006.01)

(52) U.S. Cl.
CPC .............. *H04W 4/005* (2013.01); *H04L 69/16* (2013.01); *H04L 67/12* (2013.01); *H04L 69/161* (2013.01)

(58) Field of Classification Search
CPC .... G06F 15/16; H04W 4/005; H04W 72/042; H04W 84/12; H04W 12/06; H04W 4/008; H04L 5/0053; H04L 5/0048; H04L 5/0044; H04M 2250/04
See application file for complete search history.

(56) References Cited

U.S. PATENT DOCUMENTS

| | | | |
|---|---|---|---|
| 7,031,275 B1 | 4/2006 | Borella et al. | |
| 2005/0232281 A1* | 10/2005 | Rosenzweig et al. | 370/400 |
| 2005/0283532 A1* | 12/2005 | Kim et al. | 709/225 |
| 2006/0268766 A1* | 11/2006 | Rangarajan et al. | 370/328 |
| 2011/0026461 A1* | 2/2011 | Tee et al. | 370/328 |

FOREIGN PATENT DOCUMENTS

WO 2009/063093 A2 5/2009

OTHER PUBLICATIONS

3GPP, "3rd Generation Partnership Project; Technical Specification Group Services and System Aspects; Study on Facilitating Machine to Machine Communication in 3GPP Systems; (Release 8)", 3GPP TR 22.868 V8.0.0, Mar. 1, 2007, 15 pages.

3GPP, "3rd Generation Partnership Project; Technical Specification Group Services and System Aspects; Service Requirements for Machine-Type Communications; Stage 1 (Release 10)", 3GPP TS 22.368 V1.0.0, Aug. 1, 2009, 22 pages.

ETSI, "Machine-to-Machine Communications (M2M) Service Requirements", Draft, ETSI TS 102 689 V0.3.1, Oct. 23, 2009, 48 pages.

* cited by examiner

*Primary Examiner* — Chi H Pham
*Assistant Examiner* — Raul Rivas
(74) *Attorney, Agent, or Firm* — Rothwell, Figg, Ernst & Manbeck P.C.

(57) ABSTRACT

The present invention relates to a solution for handling a plurality of machine to machine, M2M, devices in a wireless communication cell by providing a shared Internet Protocol, IP, address for the plurality of M2M devices and one of the M2M devices acts as a master device for attaching and receiving the shared IP address and other communication configuration control data from a wireless gateway. The M2M devices communicate with a central M2M server using datagrams with the shared IP address and device identity information together with data or control messages.

14 Claims, 10 Drawing Sheets

M2M RESOURCE PRESERVATION IN MOBILE NETWORKS

CROSS REFERENCE TO RELATED APPLICATION(S)

This application is a 35 U.S.C. §371 National Phase Entry Application from PCT/EP2010/065960, filed Oct. 22, 2010, designating the United States and claiming priority to U.S. Provisional Application 61/256,056 filed Oct. 29, 2009. Each of the above identified applications are incorporated by reference herein in their entirety.

TECHNICAL FIELD

The present invention relates to a solution for handling M2M resource preservation in wireless networks.

BACKGROUND

Machine-to-machine (M2M) communication over mobile and wireless networks is expected to become increasingly important in the future. An existing industry vision of 50 billion connections in 2020 will to a large extent rely on M2M devices (since the human population in 2020 is expected to be around 8 billion). Examples of possible M2M applications are almost countless. Examples include M2M devices:

- in private cars for communicating service needs, the car's position (retrieved using GPS) as well as receiving up-to-date traffic data for traffic guidance systems
- in water or electricity meters for remote control and/or remote meter reading
- in street-side vending machines for communicating when good are out-of-stock or when enough coins are present to justify a visit for emptying
- in taxi cars for validating credit cards
- in delivery cars for fleet management including optimization of delivery routes and confirming deliveries
- in ambulances for sending life-critical medicine data to the hospital prior to arriving in order to increase chances of successful treatments
- in surveillance cameras for home or corporate security purposes Some of these applications rely on mobility support, while others are located at fixed geographical locations without the need for mobility support.

M2M applications will typically rely on IP communication, meaning that the applications as such are transparent to the mobile network. What is needed is the ability to carry IP traffic from A to B, i.e. between the M2M device and a centrally located application server.

Solutions exist for how to assign security-related parameters to the terminals in a light-weight fashion (without requiring SIM cards or Soft SIMs). One solution can be found in WO 2009/002236 A1, "A Method and Apparatus for Enabling Connectivity in a Communication Network", which could be one, but not the only, way of solving the security requirements.

The problem with the existing solutions is that mobile networks are not designed to differentiate between different types of terminals. Each M2M device need to individually attach to the network and receive an IP address. This not only consumes large number of IP addresses which in the case of IPv4 is very scarce, but also put an increased signaling load on the network since a large number of devices will attach over the air (increasing startup time), as well as consume resources in the network (memory, CPU) related to the IP session itself.

Current mobile network standards do not allow for flexibility in terms of light-weight vs. normal sessions.

SUMMARY

It is therefore an object of the present invention to provide a remedy for this type of problems. The present invention allows for a group of M2M devices to register in the network as a single device only. This is made possible through exploiting four basic characteristics:

- The devices in this group are assumed to be stationary, e.g. electricity meters, vending machines etc, i.e. no need for the network to individually track movements
- These devices are normally sending very limited amounts of data UL and receive limited amount of data DL
- The devices can be associated to each other prior to attaching to the network, eg through manual configuration
- The devices are assumed to be reachable over the same radio cell, i.e. this solution is targeting a group of devices residing in the same geographical area, e g electricity meters in a residential area The solution according to the present invention is realized in a number of aspects in which a first is a method in a wireless communication network for handling machine to machine, i.e. M2M, communication with a M2M server device via a communication network gateway. A plurality of M2M devices located in communicative radio range to the communication network gateway. The method comprising the steps of:

- allocating one M2M device as master device;
- allocating the other M2M devices as fellow devices, which together with the master device forms an M2M system unity sharing one IP address;
- in a packet datagram providing source and destination IP addresses, where one of source or destination IP address is the shared IP address; and
- in a payload field of the packet datagram providing M2M device identity and payload or control field.

The method may further comprise a step wherein the master device attaches to the network and acquires an IP address useable for all M2M devices part of the M2M system unity. The method may further comprise steps of listening to radio transmission and receiving datagrams in the M2M devices and in each M2M device determining if the datagram is intended for the listening M2M device.

The method may further comprise steps of sending a datagram by multiplexing uplink datagrams from the M2M devices. Multiplexing may be performed by allowing each M2M device to transmit at any time.

Another aspect of the present invention is provided, a master device in a wireless communication network. The master device may comprise at least one processor, at least one memory, and at least one communication unit. The processor may be arranged to execute instructions sets stored in the memory for communicating, using a shared IP address and using the communication interface, with a network access gateway and wherein the master device is further arranged to exchange datagrams with the gateway where the datagrams are provided with source IP address, destination IP address, M2M device identity, and data and/or control payload. One of source or destination IP address may be the shared IP address.

Yet another aspect of the present invention is provided, a fellow device in a wireless communication network. The fellow device may comprise at least one processor, at least one memory, and at least one communication unit, and wherein the processor is arranged to execute instructions sets stored in the memory for communicating, using a shared IP address and using the communication interface, with a network access gateway and wherein the fellow device is further arranged to exchange datagrams with the gateway where the datagrams are provided with source IP address, destination IP address, M2M device identity, and data and/or control payload, and where one of source or destination IP address is the shared IP address. The fellow device may be arranged to listen to all communication traffic related to the shared IP address and arranged to extract the M2M device identity from datagrams related to the shared IP address.

Still another aspect of the present invention is provided, a system in a wireless communication network, comprising a master device and at least one fellow device.

Another aspect of the present invention is provided, a computer program stored in a computer readable storage medium for executing the method according to the present invention.

Furthermore, a machine to machine, M2M, server is provided. The M2M server may be located in a packet based network arranged to communicate with master and fellow machine to machine, i.e. M2M, devices using a shared IP address and datagrams provided with M2M device identities and the shared IP address.

The solution according to the present invention provides an advantage in that it allows for substantial savings in terms of network capacity needed to be allocated to these devices, which may come in millions.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
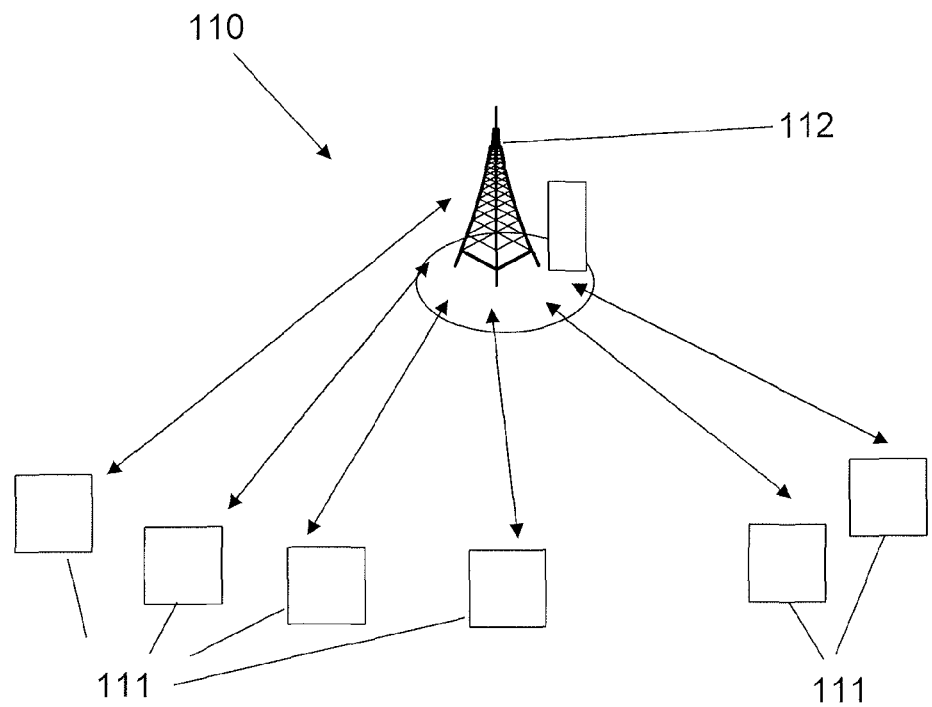
FIG. 1 illustrates schematically a network according to the present invention.

In FIG. 1 reference numeral 110 generally denote a network according to the present invention, with a plurality of network devices 111 comprising "independent" machine terminals, i.e. not depending on users operating them, and a base station 112 or similar network access gateway providing access directly or indirectly to a communication network, e.g. an IP based network. This will be discussed later in more detail in relation to FIG. 4. The network access gateway may for instance be a base station, a nodeB, an eNodeB, access point, or similar network access gateway device as appreciated by the skilled person.

Figure 2:
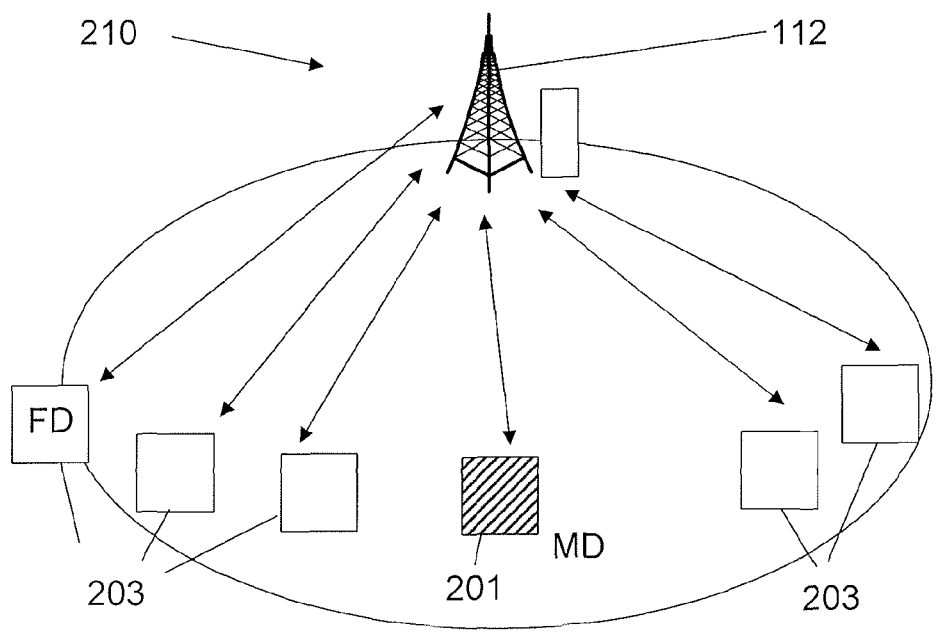
FIG. 2 illustrates schematically a network according to the present invention and illustrating the concept of master and fellow devices.

As seem in FIG. 2, a group of devices, e.g. mobile/wireless terminals, are all located in a single cell 204 of a mobile/cellular wireless network 210. One device is configured as being a master device 201 (MD) while the others are configured to be fellow devices 203 (FD). The master and fellow devices all communicate with a base station 112. The mobile/wireless terminals may be any device suitable for M2M applications, such as for instance cell phones, smart phones, laptop, vending machines, weather stations, production equipment, vehicles, surveillance equipment, and so on.

All devices are capable of connecting to a mobile network, but for the network, this group of devices appears as one single device only, since they share the same IP identity and reside in the same cell.

The master device is the device in the group that initiates the connection through the first network attach. It can also initiate a detach procedure.

The fellow device(s) shares the identity with the master device and may send and receive user data. It is however not able to do network attach and detach. For attach and detach, all fellow devices are dependent on the master device.

All devices are configured with information from the master device's SIM (or other mechanisms allowed and used in the network for secure authentication and user data encryption) to allow for any device to use the correct identity parameters and to correctly decrypt and encrypt the traffic. This configuration may be pre configured before installing the M2M devices at location or a mechanism may be used during installation or at regular intervals for exchanging appropriate information for setup purposes; such a mechanism may be facilitated by a central server solution: e.g. the M2M devices may at first (or regularly) each connect and attach to the network and communicate with a central server which keeps a record of the participating devices and one of the M2M devices are at this point selected as master device and the others as fellow devices, subsequent communication is performed with the master/fellow solution according to the present invention.

Figure 3:
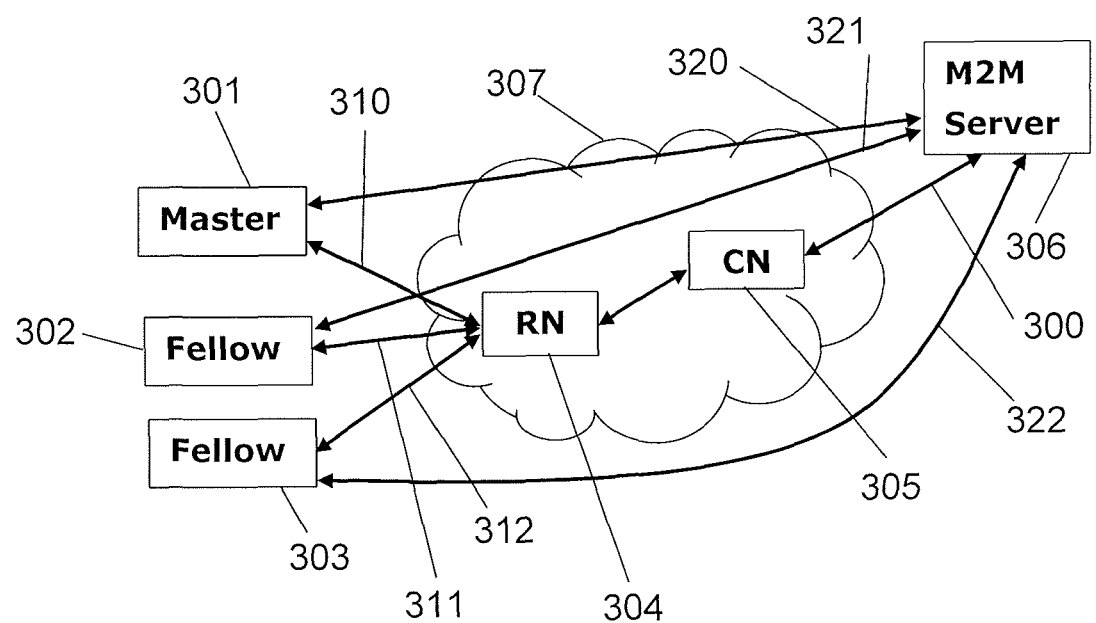
FIG. 3 illustrates schematically a network according to the present invention.

Referring to FIG. 3, the master device 301 as well as the fellow devices 1 and 2 (302, 303) connects to the mobile network using radio communications. They are connected (310, 311, 312) to one single radio base station 304 that serves the cell in which all the devices reside. The radio base station is part of the radio network (RN) 304 which is within the mobile network 307 connected (200) to a core network 305 (CN) which handles authentication and provides IP connectivity (300) to external networks where an M2M application server 306 resides. Once the devices are connected, there is then IP connectivity (320, 321, and 322) established between the devices and the M2M application server. This connection is of course transparently transported and routed via the radio network and the core network. The M2M server is arranged to handle datagrams, i.e. data packets with data or control messages, to and from the M2M devices using a shared IP address as will be discussed below in more detail, and where the datagrams also are provided with M2M device identity for determining from which M2M device a message is sent or is to be transmitted to.

Figure 4:
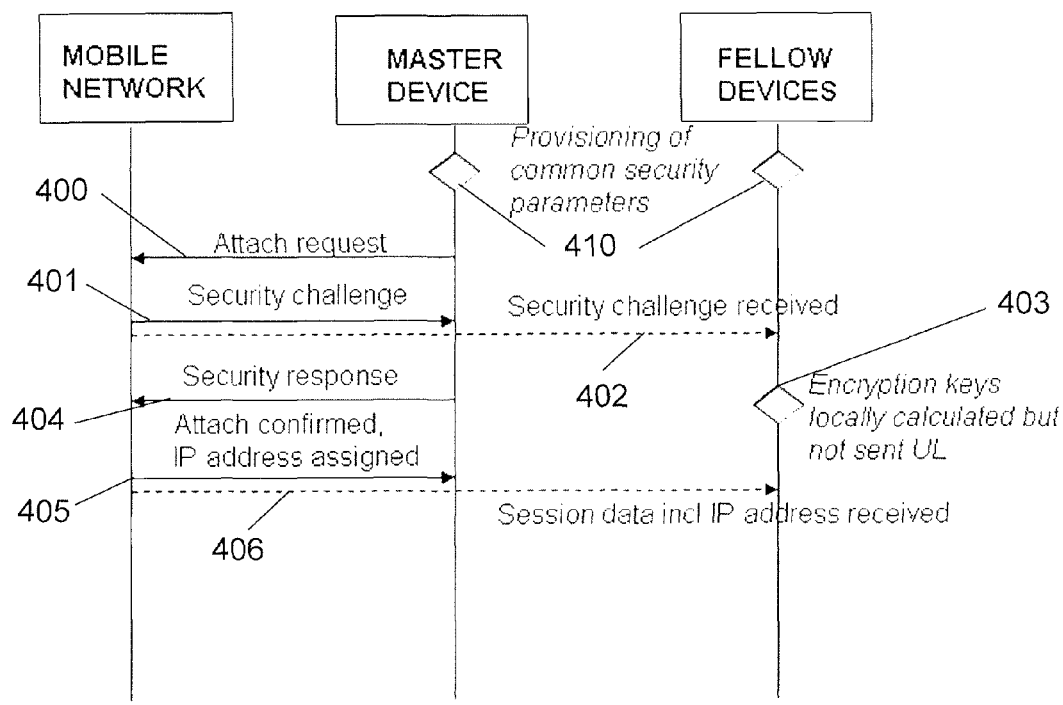
FIG. 4 illustrates schematically an attach signaling flow according to the present invention.
Figure 5:
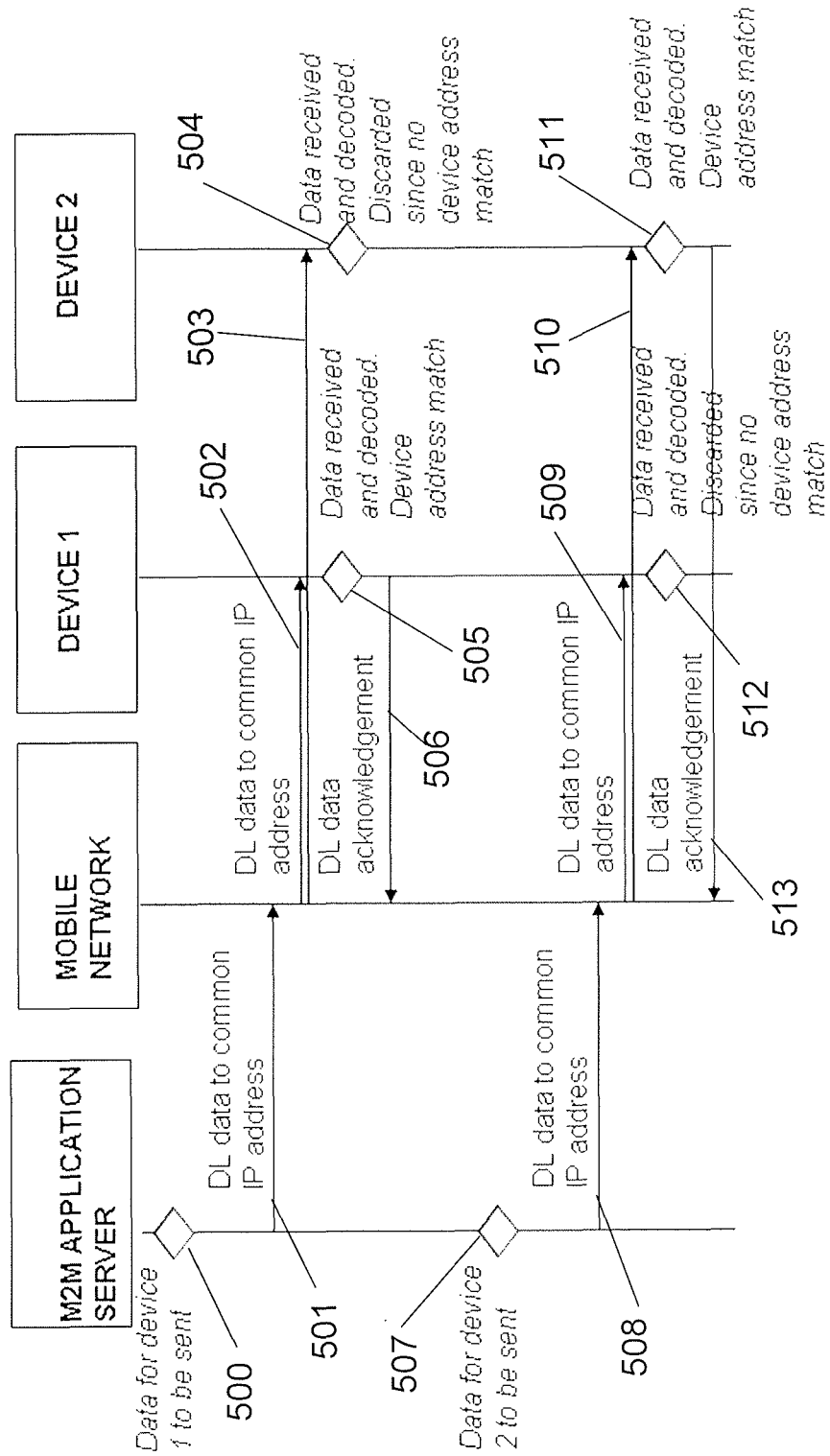
FIG. 5 illustrates schematically a downlink transmission signaling flow according to the present invention.
Figure 8:
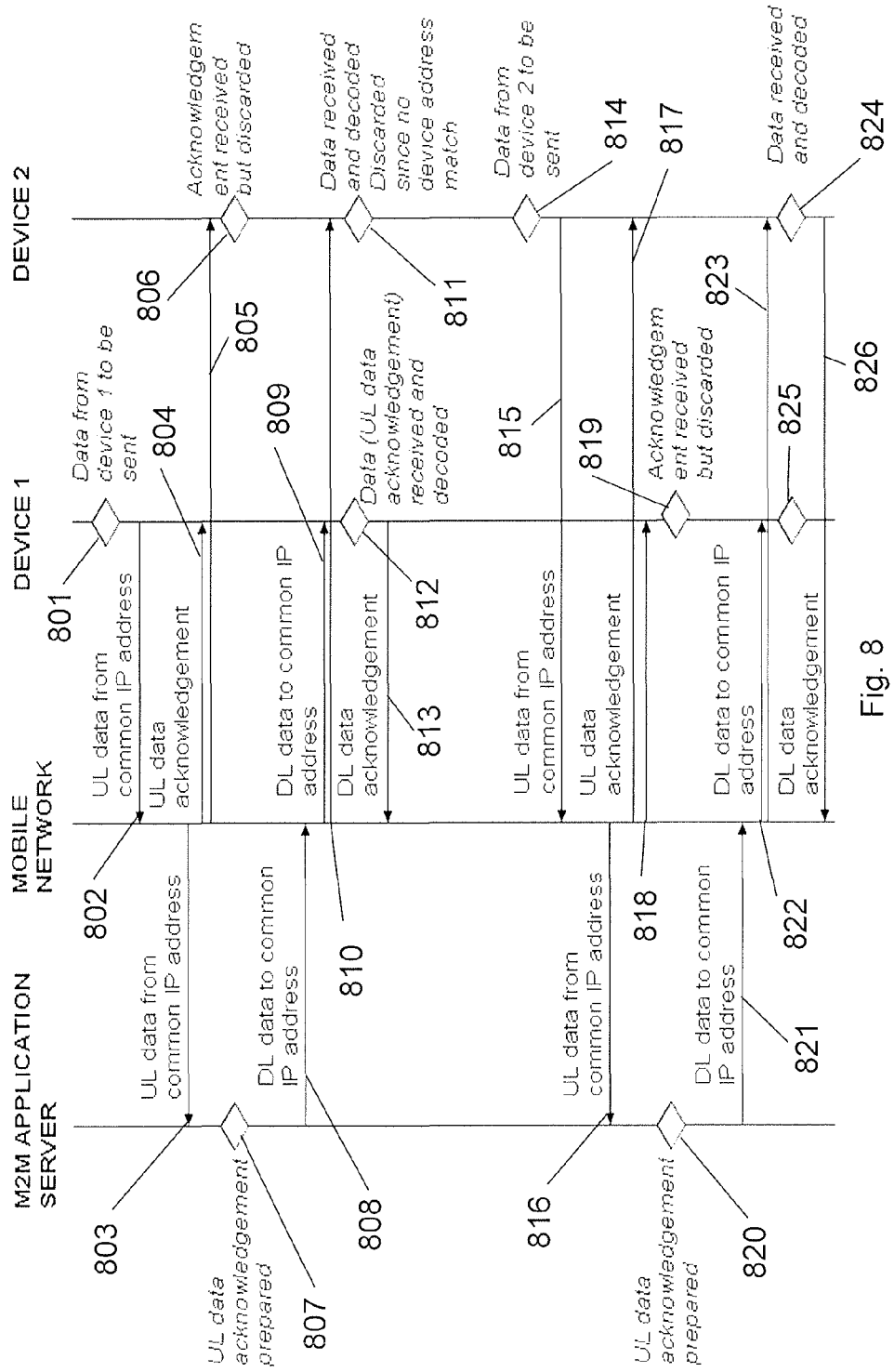
FIG. 8 illustrates schematically Uplink transmission call flow according to the present invention in a signalling diagram.

The generic call flows as shown in FIGS. 4, 5, and 8, illustrate Network Attach, Downlink Data Transmission and Uplink Data Transmission procedures respectively. All details are not shown: e.g. parameters, some intermediate steps, and so on as appreciated by the skilled person.

The diamond-shaped symbols ◇ indicate a point of action, i.e. that the corresponding network entity performs a specific task. This task is written in italics beside the corresponding diamond symbol, The master device attaches to the network as any other packet data terminal, creates an IP session and receives an IP address. All fellow devices are able to listen in to the communication between the network and the master device and create the same encryption and decryption keys (but only the master device communicates with the network at this stage). FIG. 4 illustrates the generic call flow for network attach. The master and fellow devices are authenticated and so on as appreciated by the skilled person by provisioning of common security parameters 410. Further, the master device sends an attach request 400 message to the mobile network which responds with a security challenge 401 and optionally with a security challenge received 402 by fellow devices. Encryption keys may be locally calculated in the fellow devices but is not sent uplink (UL) 403. The master device responds with a security response message 404. The mobile network sends an attach confirmed message 405 with IP address assigned to the master device and optionally session data with IP address received 406 by fellow devices. The IP address is then shared and used among all devices in the group without the mobile network being notified.

Downlink (DL) traffic is sent by the base station as normal, but intercepted by all devices through listening to the same DL data channel. The generic call flow is illustrated in FIG. 5. To start with the M2M application server determines 500 that data for a device (device 1) is to be sent. The M2M application server transmits 501 DL data to common IP address to the mobile network. The mobile network relays 502, 503 the DL data to common IP address to all devices of concern; in this case device 2 receives and decodes data but discards 504 the data since it determines that the data is not intended for device 2, whereas device 1 receives and decodes 505 data and determines that the data matches the device address of device 1. Device 1 transmits a DL data acknowledgement 506 to the mobile network. In the next example, the M2M application server determines 507 that there is data for another device (device 2) and sends 508 DL data to the common IP address to the mobile network. The mobile network in turn relays 509, 510 the DL data to the devices of concern using the common IP address with information related to the owner of the DL data as will be further discussed below in relation to FIGS. 6, 7, and 9. In this case device 2 receives and decodes the data and determines the device address is correct 511, whereas device 1 receives and decodes the data and determines that the device address is not correct 512. Device 2 sends a DL data acknowledgement message 513 to the mobile network.

Figure 6:
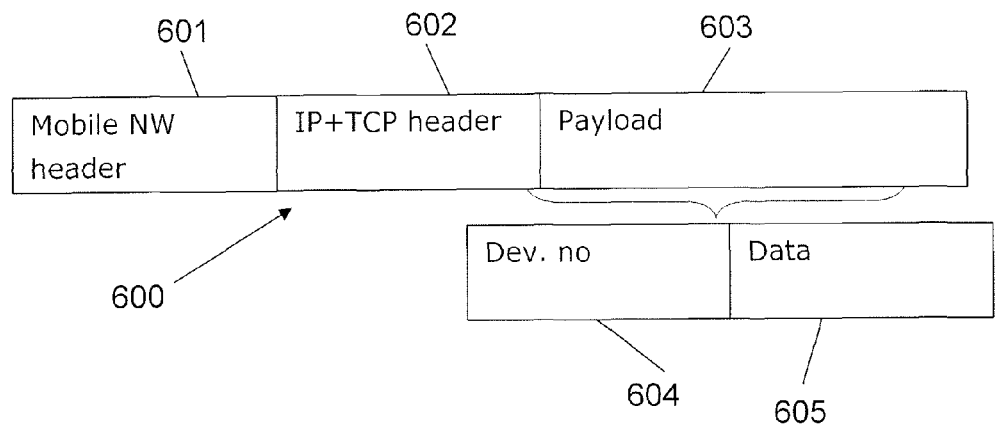
FIG. 6 illustrates schematically a principle of network-transparent device addressing using the payload field according to the present invention.

In the payload field, the exact device is addressed through a number of bits, known by the corresponding application, which is out of scope for the network operator since this is handled as payload only. This addressing is transparent to the network, but known by and preconfigured in all devices in the group. See FIG. 6 illustrating the principle of network-transparent device addressing using the payload field. Data Packets 600 are sent with a mobile network header 601, an IP header 602 with optional TCP information, and with a payload 603 part. The payload part in turn may be provided with a device number or ID field 604 and a data field 605.

Figure 7:
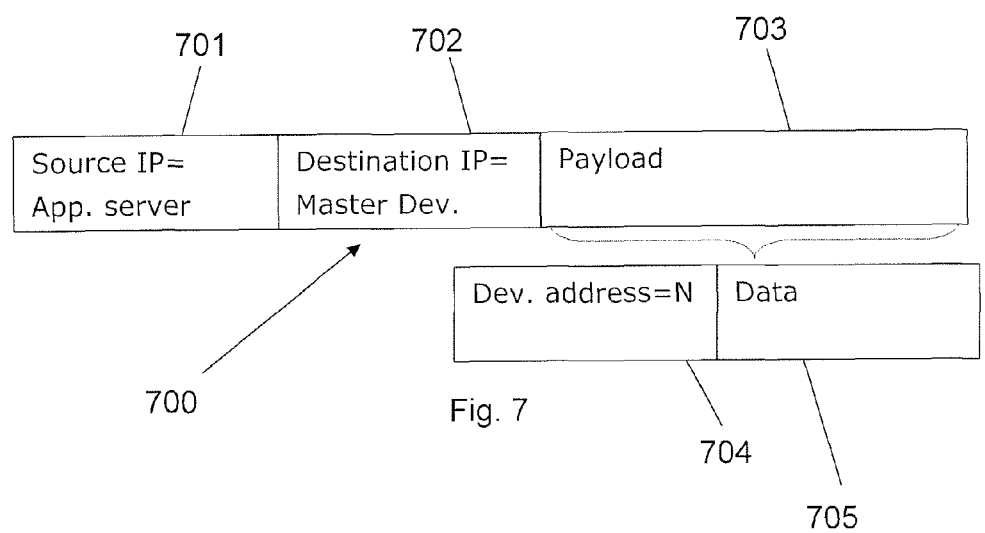
FIG. 7 illustrates schematically device addressing for downlink transmission according to the present invention.

In downlink (DL) transmissions, the data packets 700 comprise similar fields as for uplink transmission. The source and destination IP addresses for DL transmission are used as illustrated in FIG. 7; Source IP address 701 is naturally the Application Server, while the Destination IP address 702 is the IP address assigned to the master device (now representing the whole group of devices). All devices listen in, receive and decode the DL data where the device address field 704 is part of the data payload 703 sent transparently through the system. All devices except Device N discard the data due to no match. The payload also comprises a data field 705.

Exploiting the fact that the bandwidth of the packet data access channel is wide while the amount of data to send normally is quite small, the simplest way of multiplexing Uplink (UL) traffic is to allow any device to access the UL at any time. The generic call flow is illustrated in FIG. 8 (all details are not shown). A device (device 1 in this example) has data to be sent 801 and uplinks data 802 to the mobile network using a common IP address and the mobile network relays the UL data to the M2M application server also using the common IP address. The mobile network sends an UL data acknowledgement message 804, 805 to all devices in concern. Device 2 receives 806 this acknowledgement but discards the acknowledgement. In the M2M application server a UL data acknowledgement response is prepared 807 and DL data is transmitted 808 using the common IP address to the mobile network which in turn relays 809, 810 this information to the devices of concern. Device 2 receives and decodes the DL data but discards it since no device address is matched 811, whereas device 1 receives and decodes the DL data (UL acknowledgement) and determines 812 the data to be for device 1. Device 1 transmits 813 DL data acknowledgement to the mobile network. In a similar manner when device 2 determines 814 that there is UL data to be sent, it sends 815 the UL data using the common IP address to the mobile network which in turn relays 816 the UL data to the M2M application server using the common IP address. The mobile network sends an UL data acknowledgement message 817, 818 to all devices in concern. Device 1 receives 819 this acknowledgement but discards the acknowledgement. In the M2M application server a UL data acknowledgement response is prepared 820 and DL data is transmitted 821 using the common IP address to the mobile network which in turn relays 822, 823 this information to the devices of concern. Device 1 receives and decodes the DL data but discards it since no device address is matched 825, whereas device 2 receives and decodes the DL data (UL acknowledgement) and determines 824 the data to be for device 2. Device 2 transmits 826 DL data acknowledgement to the mobile network.

If the M2M application is designed to acknowledge all UL transmissions back to the device, any lost data due to collision with other devices sending UL may easily be detected and trigger a retransmission. TCP level acknowledgements may not be used since the device that sent the UL data need to be addressed in the acknowledgement message through a correct Device Number in the payload field. This is hence an application level acknowledgement.

Figure 9:
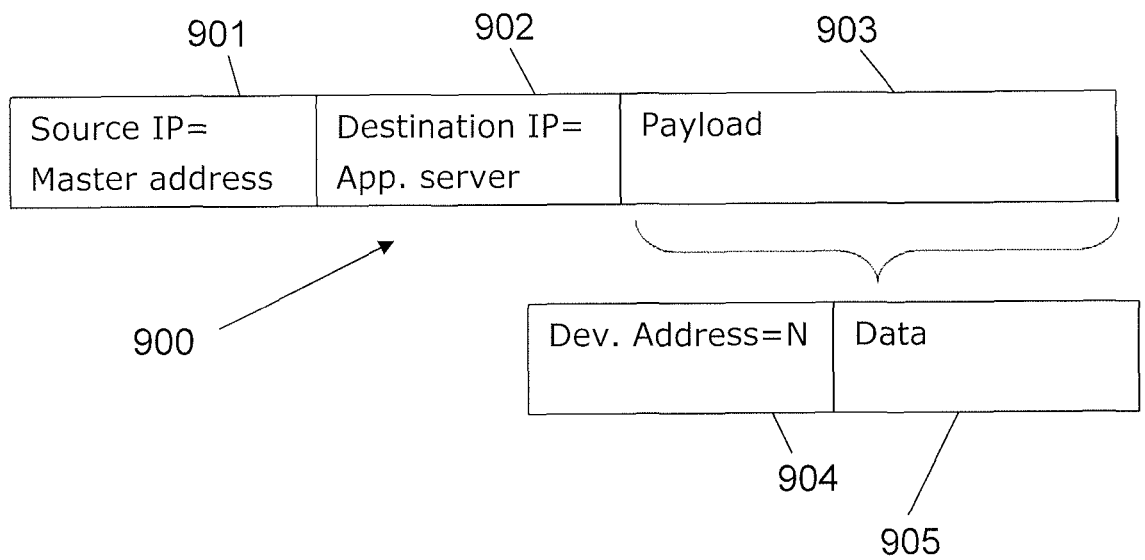
FIG. 9 illustrates schematically device addressing for uplink transmission according to the present invention.

5 The source and destination IP addresses for UL transmission are used as illustrated in FIG. 9. The data packet 900 comprises a number of fields: source IP 901, destination IP 902, and Payload 903 fields. Source IP address is the master device even though it may be another device actually sending. The Destination IP address is the IP address of the Application Server. The device address field 904 as part of the data payload 903 is used by the M2M Application Server to identify which device that sent the data. The payload field also comprises a data field 905.

Figure 10:
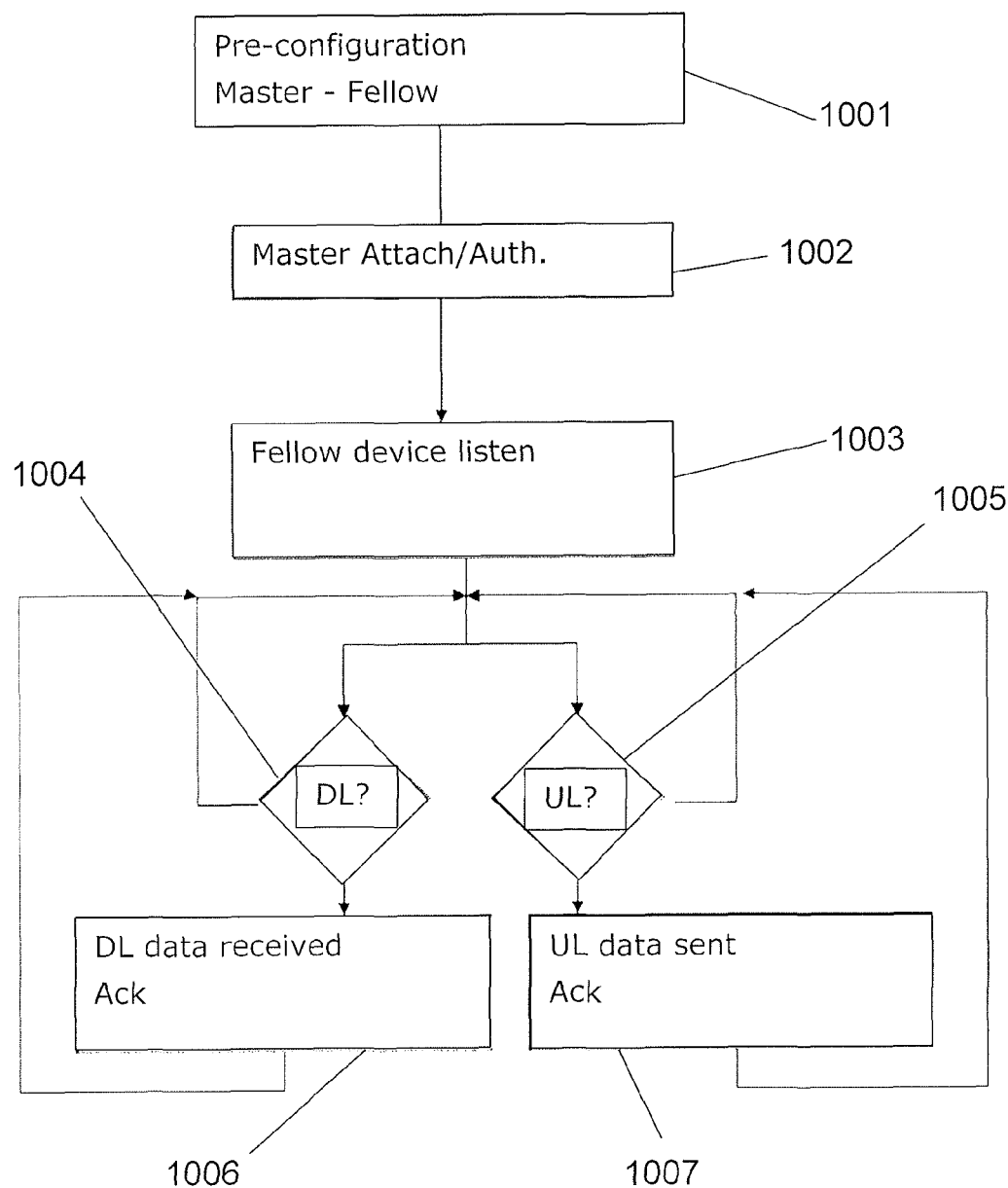
FIG. 10 illustrates schematically a method according to the present invention.

FIG. 10 illustrates in a flow diagram a method according to the present invention:

1001. A group of devices are pre-configured and one of them is assigned as master device and the rest as fellow devices.

1002. The master device attaches to the infrastructure network and is authenticated by the network.

1003. Fellow devices listen to radio communication messages and updates device-internal data as required, e.g. encryption keys, communication configuration data, and so on.

1004. Checking for incoming DL data, and/or

1005. Checking for outgoing UL data to send. If there are no data to send or receive go back to step 1003.

1006. In case of DL data: DL data is received and decoded by all devices but discarded by all devices except the addressed device. Acknowledgement is handled.

1007. In case of UL data: UL data is sent by the device that has data to send. Acknowledgement is handled.

Steps 1003 to 1007 are looped continuously as long as establishment is maintained with the network.

Figure 11:
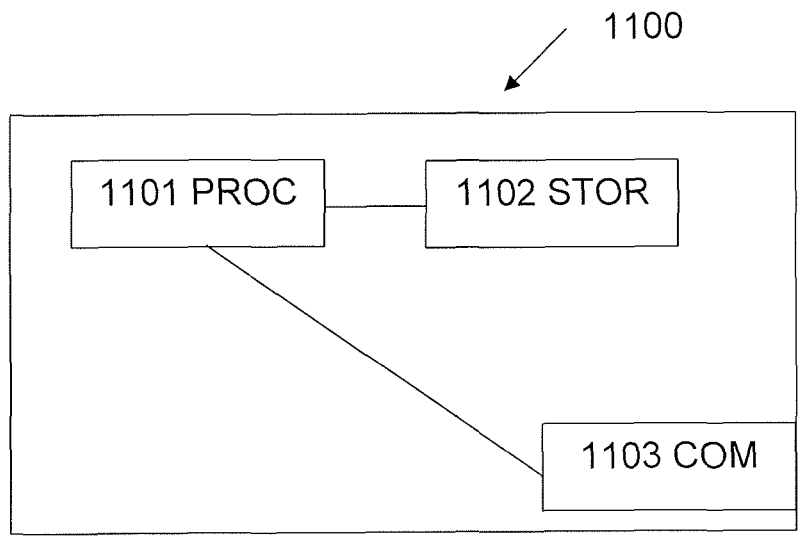
FIG. 11 illustrates schematically an infrastructure device according to the present invention.
Figure 12:
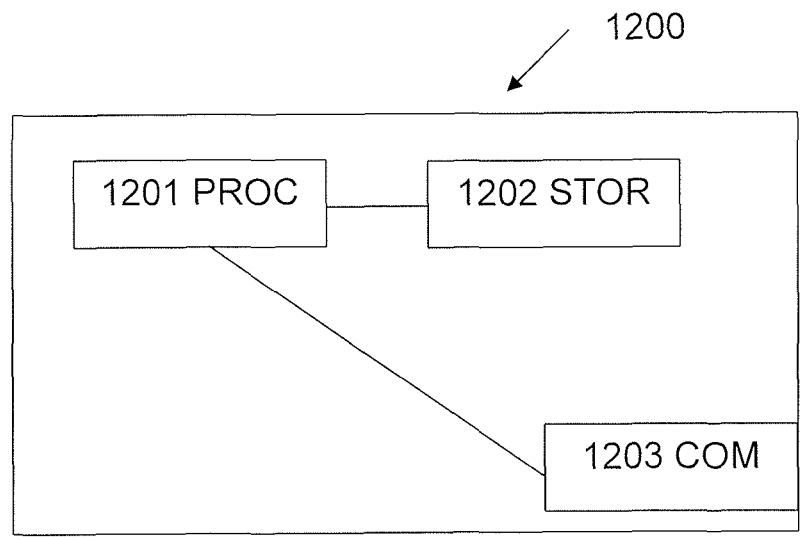
FIG. 12 illustrates schematically a master device according to the present invention.
Figure 13:
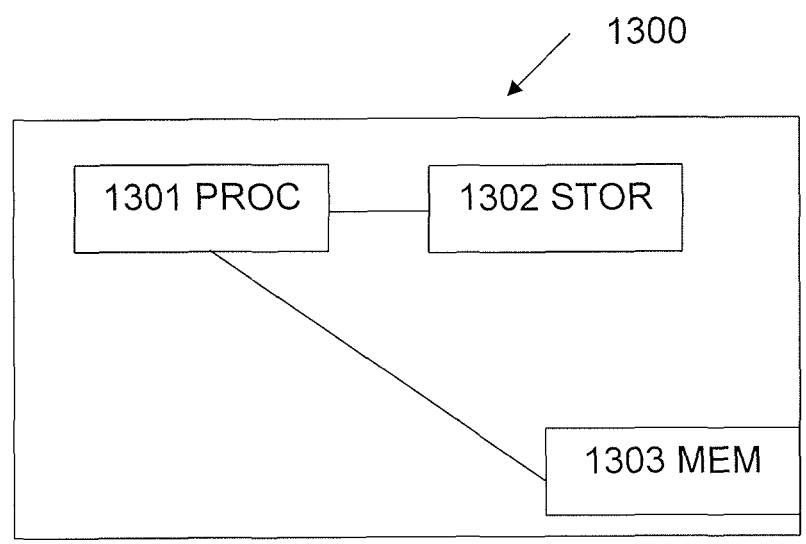
FIG. 13 illustrates schematically a fellow device according to the present invention.

FIGS. 11, 12, and 13 illustrate devices part of the invention: an infrastructure device 1100, a master device 1200, and a fellow device 1300 respectively. Each device comprise at least one processing unit (PROC) 1101, 1201, and 1301 respectively, at least one memory unit (STOR) 1102, 1202, 1302 respectively, and at least one communication unit (COM) 1103, 1203, 1303 respectively. The processing unit is arranged to execute instructions sets, hardware and/or software instructions, stored in the processing unit and/or the memory which may be a computer readable storage medium and the processing unit is arranged to use the communication unit for listening for and sending data and control traffic to other devices. The communication interface is arranged depending on radio communication type and configuration. The infrastructure device in this case may be an M2M application server. Communication unit may be a radio or wired communication unit depending on device type, and the memory may be of volatile and/or non-volatile type. The processing unit may comprise any suitable for handling software and/or hardware instruction sets stored in the memory and/or the processor, e.g. a microprocessor, a digital signal processor, an application specific integrated circuit (ASIC), or field programmable gate array (FPGA).

The software may be distributed to the M2M devices using the network for updating already installed devices.

The radio communication may be any suitable packet based communication RAT such as for instance some configurations of LTE, UTRAN, GERAN, E-UTRAN, CDMA2000, WCDMA, UWB, WLAN and WRAN based solutions, such as WiMax, Wifi and other IEEE 802.xx based communication standards suitable for packet based communication with similar listening in capabilities as used with the present invention, and so on.

The invention is not limited to the TCP protocol; other protocols may be used in relation to IP communication, such as for instance UDP and FTP.

The master/fellow solution according to the present invention may be seen as different from a master/slave solution, since in the present invention, the fellow devices are not controlled by the master device, they are only dependent on the master device for attachment and obtaining the shared IP address and other communication configuration control data; whereas in the master/slave solution the master control when and how slaves are to communicate.

The invention allows for a light-weight deployment of large number of M2M devices, potentially with no impact on the mobile network procedures. This allows a much more cost efficient solution when supporting large number of M2M devices. Not only is the deployment simplified due to little, if any, impact on the network functionality, but it also allows for a more optimized scaling in that groups of devices are treated as a single device in the network, consuming much less network resources in terms of memory, processing power, addressing resources, and so on.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

References

[1] WO 2009/002236 A1, A Method and Apparatus for Enabling Connectivity in a Communication Network Abbreviations CDMA2000 Code Division Multiple Access 2000
DB Data Base
DL Downlink
EDGE Enhanced Data Rates for GSM Evolution
E-UTRAN Evolved Universal Terrestrial Radio Access Network
FTP File Transfer Protocol
GERAN GSM/EDGE Radio Access Network
GPS Global Positioning System
GSM Global System for Mobile Communications
IEEE Institute of Electrical and Electronics Engineers
IP Internet Protocol
ISM band Industrial, Scientific and Medical Spectrum Band
LTE Long Term Evolution
M2M Machine to Machine
PAN Personal Area Network
RAN Radio Area Network
RAT Radio Access Technology
RCI RAT Connection Information
Rx Reception
TCP Transmission Control Protocol
Tx Transmission
UDP User Datagram Protocol
UE User Equipment
UL Uplink
UMTS Universal Mobile Telecommunications System
UTRAN Universal Terrestrial Radio Access Network
UWB Ultra WideBand
WAN Wide Area Network
W-CDMA Wideband Code Division Multiple Access
WLAN Wireless Local Area Network
WRAN Wireless Regional Area Network

The invention claimed is:

1. A method in a packet based wireless communication network for handling machine to machine (M2M) communication with an M2M application server via a communication network gateway, wherein a plurality of M2M terminal devices are located in communicative radio range to the communication network gateway, the method comprising the steps of:
- allocating one M2M terminal device as a master device;
- allocating the other M2M terminal devices as fellow terminal devices, which together with the master terminal device form an M2M system sharing one IP address;
- providing, in a packet datagram, source IP address and destination IP address, wherein one of the source IP address and destination IP address is the shared IP address;
- providing an M2M device identity of an M2M device for which a radio communication traffic transmission is intended in a payload field of the packet datagram such that M2M device addressing is transparent to the network; and
- listening, in the fellow terminal devices, to all radio communication traffic transmission related to the shared IP address of the M2M system and extracting the M2M device identity that indicates the M2M device for which the transmission is intended from packet datagrams related to the shared IP address, wherein the M2M device identity uniquely identifies a single one of the fellow terminal devices, wherein
- the M2M terminal devices are not being human operated.

2. The method according to claim 1, further comprising a step wherein the master device attaches to the network and acquires the shared IP address useable for all M2M devices that are part of the M2M system.

3. The method according to claim 1, further comprising steps of sending a datagram by multiplexing uplink datagrams from the M2M devices.

4. The method according to claim 3, wherein the multiplexing is performed by allowing each M2M device to transmit at any time.

5. A fellow terminal device for use in a wireless communication network, comprising a processor, a memory, and a communication unit, wherein the processor is arranged to execute instructions stored in the memory for communicating, using a shared IP address and using the communication unit, with a network access gateway, and wherein the fellow terminal device is further arranged to:
- exchange packet datagrams with the gateway, wherein the packet datagrams are provided with a source IP address, a destination IP address, and an M2M device identity of an M2M device for which a radio communication traffic transmission is intended, wherein one of the source IP address and destination IP address is the shared IP address, and wherein the M2M device identity is provided in a payload field of the packet datagrams such that M2M device addressing is transparent to the network, and
- listen to all radio communication traffic transmission related to the shared IP address and extract the M2M device identity that indicates the M2M device for which the transmission is intended from packet datagrams related to the shared IP address, wherein the M2M device identity uniquely identifies a single one of a plurality of fellow terminal devices, wherein
- the M2M device is not a human operated device.

6. The method of claim 1, wherein the packet datagram includes an IP header, a transport layer header, and the payload field.

7. The fellow terminal device of claim 5, wherein the packet datagrams include an IP header, a transport layer header, and the payload field.

8. A method for facilitating communication by machine-to-machine (M2M) devices over a packet-based wireless communication network, the M2M devices including a master device and a fellow terminal device, the method comprising:
- the fellow terminal device listening to communication between a gateway of the network and the master device relating to a network attach procedure initiated by the master device, wherein the fellow terminal device does not participate in the network attach procedure;
- the fellow terminal device listening to a message from the gateway that allocates an IP address to the master device as part of the network attach procedure; and
- the fellow terminal device using the IP address allocated to the master device to communicate over the network, wherein the fellow terminal device receives the IP address without performing any network attach procedure, wherein
- the M2M devices are not being human operated.

9. The method of claim 8, wherein the fellow terminal device does not notify the gateway of the fellow terminal device's use of the IP address.

10. The method of claim 8, wherein the step of listening to the communication between the gateway and the master device comprises:
- the fellow terminal device listening to a message related to the network attach procedure from the gateway; and
- the fellow terminal device listening to the master device responding to the message, wherein the fellow terminal device does not respond to the message.

11. The method of claim 1, wherein the master device is able to perform a network attach procedure and a network detach procedure, and the fellow terminal devices are not able to perform a network attach procedure and are not able to perform a network detach procedure.

12. The method of claim 2, wherein none of the fellow terminal devices communicates with the network during the step of the master device attaching to the network and acquiring the shared IP address.

13. The method of claim 1, further comprising:
- a first one of the M2M terminal devices determining that radio communication traffic is not intended for the first one of the M2M terminal devices based on the M2M device identity extracted from the radio communication traffic; and
- a second one of the M2M terminal devices determining that the radio communication traffic is intended for the second one of the M2M terminal devices based on the M2M device identity extracted from the radio communication traffic, wherein the M2M device identity uniquely identifies the second one of the M2M terminal devices from among the M2M terminal devices.

14. The method of claim 13, further comprising:
- the first one of the M2M terminal devices discarding the radio communication traffic; and
- the second one of the M2M terminal devices transmitting an acknowledgment of the radio communication traffic to the network.

* * * * *